United States Patent [19]

Fassbinder

[11] Patent Number: 4,700,578

[45] Date of Patent: Oct. 20, 1987

[54] APPARATUS FOR MEASURING A BULK STREAM

[75] Inventor: Hans-Georg Fassbinder, Sulzbach-Rosenberg, Fed. Rep. of Germany

[73] Assignee: Klockner CRA Technologie GmbH, Fed. Rep. of Germany

[21] Appl. No.: 836,391

[22] Filed: Mar. 5, 1986

[30] Foreign Application Priority Data

Mar. 6, 1985 [DE] Fed. Rep. of Germany ....... 3507993

[51] Int. Cl.$^4$ ............................................. G01F 1/82
[52] U.S. Cl. ................................................ 73/861.37
[58] Field of Search ........... 73/861.35, 861.36, 861.37, 73/861.38

[56] References Cited

U.S. PATENT DOCUMENTS 2,775,125 12/1956 Peaceman ........................ 73/861.38
2,934,951 5/1960 Li ..................................... 73/861.35

FOREIGN PATENT DOCUMENTS 1211415 9/1966 Fed. Rep. of Germany .
7023502 11/1972 Fed. Rep. of Germany .

*Primary Examiner*—Herbert Goldstein
*Attorney, Agent, or Firm*—Robert J. Koch

[57] ABSTRACT

An apparatus for measuring a preferably heterogeneous bulk stream having a rotating element borne by a shaft, said element being driven at a constant speed and radially deflecting the bulk stream acting axially upon said rotating element, thereby impressing on it a tangential velocity component, the torque dependent on the bulk stream being measured at the shaft, and having a two-step spur gear disposed in a carrier element and having four spur wheels with geometrical radii $R_1$, $R_2$, $R_3$ and $R_4$, respectively, the first spur wheel which is disposed on the shaft meshing with the second spur wheel which is disposed on the intermediate shaft and the third spur wheel which is also disposed on the intermediate shaft meshing with the fourth spur wheel disposed on a driving shaft. The intermediate shaft movably mounted in the carrier element, the direction of movement of said intermediate shaft corresponding to the direction of the reaction force acting on the intermediate shaft, is fixed in its position by a force measuring means and the idling friction torque $RM_A$ of the output shaft and the idling friction torque $RM_Z$ of the intermediate shaft satisfy, with their absolute values and the predetermined condition $R_3$ is greater than $R_2$, the following condition:

$$\frac{R_3 - R_2}{R_1} = \frac{RM_Z}{RM_A}.$$

8 Claims, 2 Drawing Figures

APPARATUS FOR MEASURING A BULK STREAM

BACKGROUND OF THE INVENTION

1. Field of the Invention

The present invention relates to an apparatus for measuring a bulk stream.

2. Description of the Related Art

A number of apparatus are already known for directly measuring bulk streams, i.e. a mass-time unit. One class of these apparatus is based on the principle of measuring that force which must be expended to impress a definite angular velocity or tangential velocity component on a bulk stream flowing linearly through a conduit. The necessary force is directly proportional to the bulk stream. The following relation holds:

torque = $k$·angular velocity·bulk stream

If the angular velocity is thus kept constant, the bulk stream is a linear function of the torque.

Apparatus are already known for measuring the flow rate of bulk material wherein the bulk material is directed axially onto a rotary plate bordered by radially extending guide blades. The rotary plate is driven by a synchronous motor at a constant motor speed and the driving torque measured. The change in this torque is a direct measure of the fluctuations in the bulk stream.

Different solutions are known for measuring this torque. The most simple solution consists in measuring the power consumption of the motor. However, this method yields quite imprecise results since the measuring result also includes all succeeding, constantly changing frictional losses both in the motor and in a set of gears which may follow (German utility model No. 70 23 502).

Picking up the torque directly from the driving shaft of the rotary plate has also proved to be disadvantageous since the measured values must be picked up from the rotating shaft via brush type contacts, which leads to a high susceptibility to disturbance under rough operating conditions (U.S. Pat. No. 2,934,951).

It is also known to arrange the driving motor for the rotary plate directly below the rotary plate and pivot the motor about its driving axle. Torsion of the motor housing is monitored by an arm protruding into a moving coil and attached to the motor housing. The reaction torque corresponding to the driving torque seeks to turn the motor housing around. This torsion is compensated by an electromagnetic force exerted by the moving coil on the arm. This force, which constantly holds the motor housing in a definite desired position, is proportional to the current consumption of the moving coil. The value of this current is thus a measure of the mass flowing over the rotary plate per unit of time (German Pat. No. 1 211 415). This solution is not practicable if only because the driving motors required to accelerate high bulk streams have a large inert mass which can only be adjusted to a definite desired position by generating high electromagnetic forces. However, if the controlling torque is so high small fluctuations in the measurable variable can no longer be observed reliably enough. The known solution furthermore does not allow for a set of gears to be inserted.

An apparatus is also known (U.S. Pat. No. 2,771,773) in which the torque is measured which is exerted on the intermediate shaft of a set of gears disposed between the driving motor and the rotary plate. The intermediate shaft of the spur gear is mounted in the shank whose lower end is suspended such that the shank can be swivelled about an axis directed perpendicular to the axis of the gearwheels and located on a plane parallel to the gearwheels. The swivelling axis of the shank for the intermediate shaft is furthermore arranged such that the shank is tilted out of the plane of action of the teeth by the driving pinion together with the intermediate shaft and the intermediate gearwheel. This displacement is counteracted by a spring which compensates no more than the no-load torque. If a larger torque is transmitted when a bulk stream acts upon the rotary plate, the shank is held in its position pneumatically. The pressure required therefor, which is read off an appropriate measuring instrument, is again a measure of the transmitted torque.

The disadvantage of this apparatus is in particular the long idle time which necessarily passes until a measured value is displayed after the compensating pneumatic pressure is adjusted. It is not possible to regulate pulsating streams of bulk material using the known apparatus. Furthermore, the regulating apparatus is elaborate and the susceptibility to trouble is accordingly high.

Most recently, chemical and metallurgical methods have been developed by which powdery or fine-grained substances are made to react with each other or with liquid or gaseous substances in a precisely defined stoichiometric ratio in a continuous process. Examples of this are the gasification of coal and the melt reduction of iron ores. These methods require that the bulk streams of several components be coordinated, which presupposes the measurement and regulation of these bulk streams. As already explained above, the main problem consists in measuring the torque or braking moment (n·m) precisely enough. The shaft of the rotating element is naturally slowed down not only by the stream of material but also by frictional forces. These frictional forces change considerably when the temperature fluctuates since the viscosity of the lubricants required for the shaft bearing changes.

SUMMARY OF THE INVENTION

The invention is based on the problem of developing an apparatus of the type described at the outset, in such a way that the display of the measuring means is independent of the temperature-related viscosity and thus of the internal friction in the spur gear, so that the measured braking moment is a measure of the size of the passing bulk stream at any temperature without using calibration curves.

This problem is solved by an apparatus as described below.

The solution to the problem is based on the finding—and the endeavor to realize this—that the effects can be compensated which act on the driving shaft of the rotating element, on the one hand, and on the intermediate shaft, on the other hand, due to viscosity forces in the gearing. The radii of the spur wheels are selected according to the invention such that the idling friction torque which acts upon the bearing of the intermediate shaft acts in the opposite direction to the idling friction torque of the intermediate shaft. On this basis these oppositely directed idling friction torques are then set, for example by using gearwheels of different predetermined widths, such that the moments seeking to move the bearing of the intermediate shaft in no-load operation neutralize each other, thereby completely compensating the disturbing moments. If the viscosity of the gearing oil changes dependent on the temperature, the idling friction torques may also change, but to the same degree so that the compensation is maintained.

BRIEF DESCRIPTION OF THE DRAWINGS

Embodiments of the invention shall be described by way of example in the following with reference to the adjoined drawings.

DETAILED DESCRIPTION OF THE PREFERRED EMBODIMENT

Figure 1:
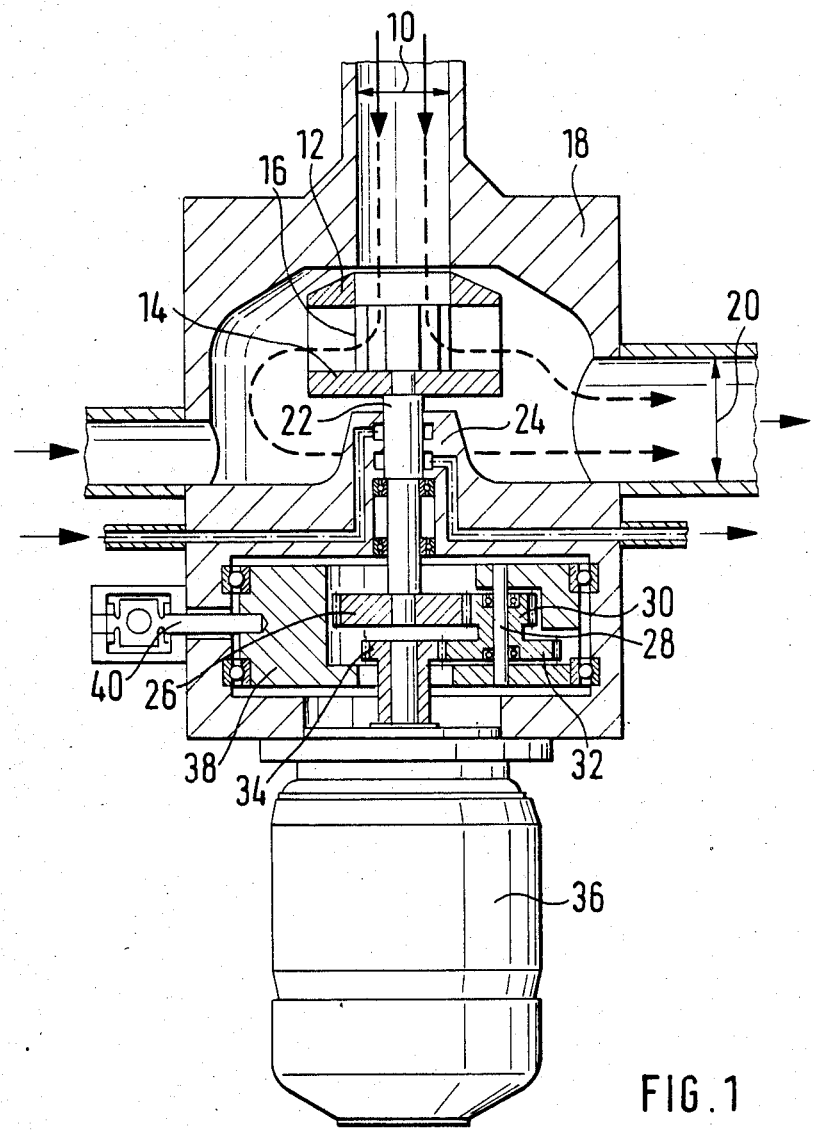
FIG. 1 shows a schematic vertical section of the apparatus

According to FIG. 1, the bulk stream reachs a rotating element 12 via a feeding pipe 10 and a conveying fluid is introduced from the left.

Rotating element 12 is designed as an impeller wheel in the present case, and consists of a horizontal rotary plate 14 with guide blades 16 placed thereon. The bulk stream acting upon the rotating element or impeller wheel 12 axially from above is deflected from its axial direction and given a tangential velocity component. Impeller wheel 12 thus comprises enough guide blades 16 that all mass particles when leaving the impeller wheel have the angular velocity by which the impeller wheel is driven. The approximate path of movement followed by the particles through the impeller wheel is indicated by a dotted arrow.

Impeller wheel 12 rotates in a housing 18 whose inner chamber is designed such that it offers the flowing bulk material as few sharp edges and as little resistance as possible. After the bulk material has left the impeller wheel in a radial direction it flows in housing 18 to an outlet 20 whose cross-sectional area corresponds at least to that of feeding pipe 10 for the bulk stream.

Impeller wheel 12 is driven by a shaft 22 which runs on bearings in a shank 24 fixed on the housing, in such a way that axial forces which occur can be absorbed.

At the lower end of shaft 22 a driving spur wheel 26 is wedged up which mates with a gearwheel 30 supported on an intermediate shaft 28. A further spur wheel 32 attached to this shaft mates with the driving pinion 34 of a motor 36 flange-mounted below the apparatus in the axle of the driving shaft for the impeller wheel.

The gearing or the intermediate shaft with the two gearwheels 30 and 32 are disposed in a gear housing 38 which can be rotated about the center axis of the apparatus. In the embodiment shown, this is realized in such a way that the gear housing 38 is supported on a ball bearing with a relatively large diameter inserted in a flange of the housing.

The torsion of gear housing 38 due to the transmitted torque is limited and measured by a force measuring means 40. Such force measuring means are known and available commercially. They essentially comprise a firmly restrained bending arm whose bending under the effect of a force acting on the end of the arm is detected by means of wire strain gauges adhered thereto. Calibrated accordingly, such wire strain gauges directly indicate the force exerted on them.

If a bulk stream of a certain size flows through the apparatus, a torque of a certain size must be transmitted to maintain a certain constant angular velocity W of impeller wheel 12. The gear housing 38, which is mounted virtually free of friction, turns around under the effect of the reactive torque by a certain small angle which leads to a displacement of the measuring finger of force measuring means 40. The larger the displacement of this measuring finger is, the larger the counterforce supplied and measured by the force measuring means is, this counterforce being a direct measure of the bulk stream flowing through the impeller wheel.

In the following, $R_1$ refers to the radius of driving gearwheel 26 on shaft 22 leading to the rotating element, $R_2$ and $R_3$ refer to the radii of gearwheels 30 and 32, respectively, on intermediate shaft 28, $R_2$ meshing with $R_1$ and $R_3$ meshing with driving pinion 34.

The measured torque $M_S$ of gear housing 38 is composed of two opposite portions $M_{S1}$ and $M_{S2}$. The former comes from driving shaft 22 and has the following value:

$$M_{S1} = \left( \frac{R_1 + R_2}{R_1} \right) M_A,$$

$M_A$ being the load moment on the driving shaft. The second part comes from driving pinion 34 and has the following value:

$$M_{S2} = -\frac{R_2}{R_3} \cdot \frac{(R_1 + R_2)}{R_1} \cdot M_A$$

This results in the following for $$M_S = M_{S1} + M_{S2} \qquad (I)$$

$$M_S = \left( \frac{R_3 - R_2}{R_3} \right) \cdot \left( \frac{R_1 + R_2}{R_1} \right) \cdot M_A$$

The measured torque and thus the sensitivity of the measuring assembly is thus larger, the larger $R_3$ is selected against $R_2$ and the smaller $R_1$ is selected against $R_2$. When the driving shaft leading to the rotating element idles without a load, only idling moment $RM_A$, which is due to the friction, remains of $M_A$, i.e. the initial torque. This friction leads according to Equation (I) to a reaction moment $RM_S'$ on gear housing 38:

$$RM_S' = \frac{R_3 - R_2}{R_3} \cdot \frac{R_1 + R_2}{R_1} \cdot RM_A$$

A second oppositely directed portion $RM_S''$ comes from friction torque $RM_Z$ of intermediate shaft 28. The following applies herefor according to a similar consideration:

$$RM_S'' = -\left( \frac{R_1 + R_2}{R_3} \right) RM_Z$$

The sum of the two portions $RM_S = RM_S' + RM_S''$ is the disturbance variable caused by frictional losses. It can become zero when the following holds:

$$\left( \frac{R_3 - R_2}{R_3} \right) \cdot \left( \frac{R_1 + R_2}{R_1} \right) RM_A = \qquad (II)$$

-continued $$\left(\frac{R_1 + R_2}{R_3}\right) RM_Z \text{ or } \left(\frac{R_3 - R_2}{R_1}\right) = \frac{RM_Z}{RM_A}$$

If Equation (II) is satisfied, the frictional influence is precisely compensated according to the invention and it is possible to measure independently of internal friction in the gearing changing due to temperature changes.

For $R_3 < R_2$ the measuring signal $M_S$ has negative values (see Formula 1), i.e. it is opposite to the load moment $M_A$. Since the friction torque of the intermediate shaft is also opposite to $M_A$, it is impossible to compensate the friction torque. $R_3$ must therefore always be larger than $R_2$ according to the invention.

In the following, the cases will be treated for the sake of simplicity in which $R_3 = R_1 = 2R_2$.

Thus, the first bracketed term in Formula (II) is equal to 0.5. A simple measuring device which satisfies both conditions and is suitable for measuring the torque range down to 0–20 Nm is shown in FIG. 1. For this case, Formula (II) requires that $$\frac{R_3 - R_2}{R_1} = \frac{2 - 1}{2} = 0.5 = \frac{RM_Z}{RM_A},$$

i.e. the friction torque of intermediate shaft 28 must be half as large as that of output shaft 22.

This requirement can be met by an expedient choice of the gearwheel width. It has been determined by experimentation that the influence of friction on the measuring signal is <0.5% in a temperature range from −20° to +50° C.

Figure 2:
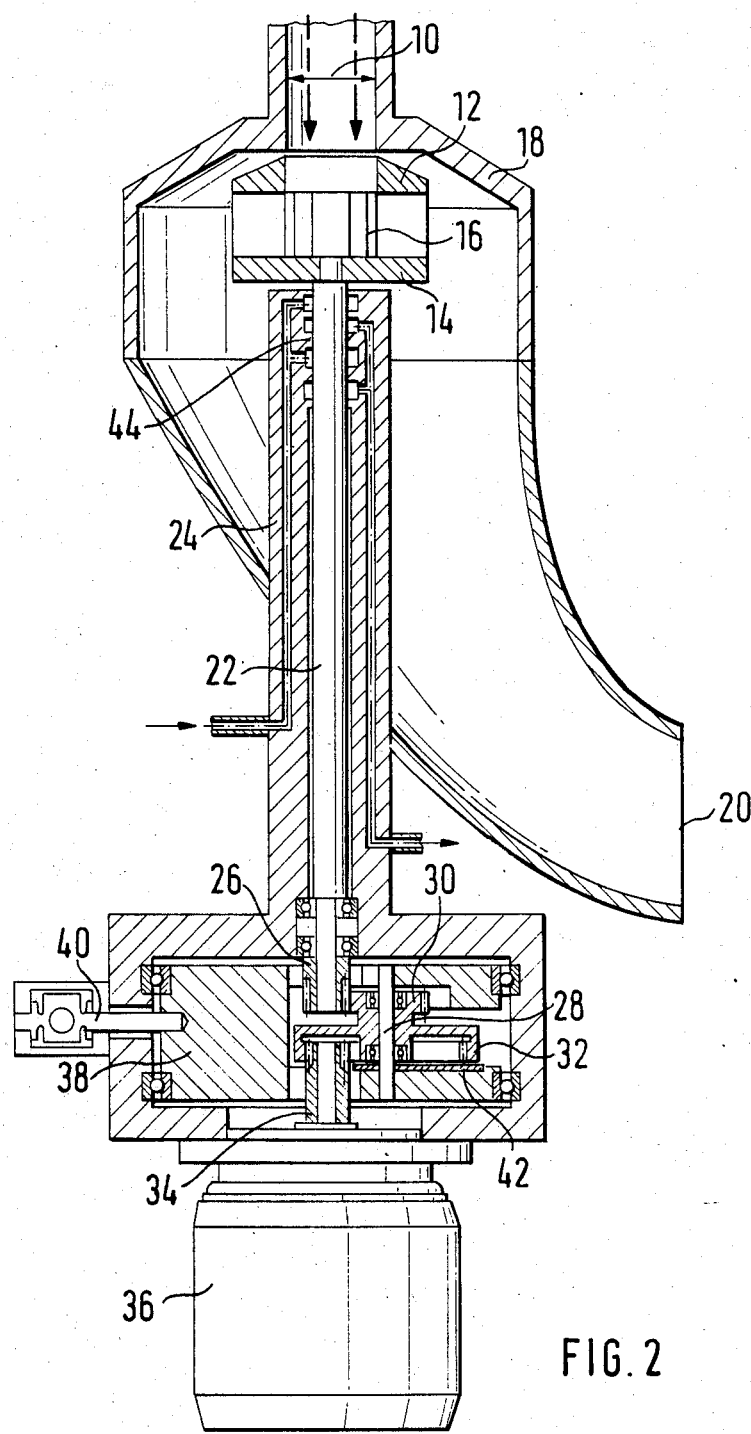
FIG. 2 shows a schematic vertical section of a further apparatus modified with respect to the apparatus of FIG. 1

The sensitivity of the measuring means can be considerably increased by designing the gearing in the manner shown in the embodiment of FIG. 2.

Diameter $R_1$ of gearwheel 26 on the driving shaft leading to the rotating element is selected as small as possible in order to minimize the circumferential velocity of the gearwheels and thus the friction as a whole, at a given output speed. The problem has also been solved of satisfying not only the requirement $R_3 > R_2$ but also the condition $R_2 > R_1$ in order to achieve a high degree of sensitivity according to Formula (I).

For the stated conditions to be satisfied, gearwheel 32 had to be provided with internal toothing. According to one embodiment, $R_2 = 2R_1$ and $R_3 - 2R_2 = 4R_1$. This resulted in the following according to Formula (II):

$$\frac{R_3 - R_2}{R_1} = \frac{4 - 2}{1} = 2 = \frac{RM_Z}{RM_A}$$

The friction torque of intermediate shaft 28 must thus be twice as large as the friction torque of output shaft at 22. This can be effected, for example, in the embodiment shown in FIG. 2 using a plate 42 slidingly disposed parallel to the plane of gearwheel 32 spaced a small distance therefrom, thus acting as a hydraulic brake.

The apparatus shown made it possible to increase the sensitivity by a factor of ten so that the measurable torque range is 0–2 Nm, whereas the precision remained the same as in the embodiment shown in FIG. 1. Such a result can of course only be achieved if all bearings are disposed within gear housing 38 and the temperature-related viscosity of the gearing oil has the same effect on all these bearings. In the embodiment shown in FIG. 2, driving shaft 22 had to be formed very long so that a second bearing 44 was necessary outside gear housing 38. Since this bearing inevitably assumes a different temperature during operation to that of the gear housing, the temperature dependency of the frictional influence and the resulting zero-point fluctuation are considerably larger. It was possible to counter this problem by designing the outer bearing 44 as a gas bearing, in which compressed gas bears the shaft virtually free of friction in the known manner. This design can be realized without too much trouble since the gap sealings for the shaft must be rinsed with pure compressed gas anyway to allow the apparatus to be used in a conduit under overpressure and carrying dust.

The zero-point adjustment of the apparatus is performed as follows: the apparatus is filled with a very viscous oil, whose viscosity corresponds to the viscosity of a standard oil at −20° C. With this oil, the zero-point is precisely adjusted by adjusting the hydraulic brake or plate 42, this zero-point being maintained, after changing to standard oil, at every temperature which customarily occurs.

What is claimed is:

1. An apparatus for measuring a bulk stream comprising:
   a rotating element borne by a first shaft,
   means for axially introducing said bulk stream to said element, said element being driven at a constant speed and radially deflecting the bulk stream acting axially upon said rotating element, thereby impressing on it a tangential velocity component, the torque dependent on the bulk stream being measured at the first shaft;
   a two-step spur gear disposed in a pivot mounted carrier element (38) and having four spur wheels;
   the first spur wheel is disposed on the first shaft and meshes with the second spur wheel disposed on an intermediate shaft;
   the third spur wheel is also disposed on the intermediate shaft and meshes with the fourth spur wheel, said fourth spur wheel is disposed on a driving shaft,;
   the intermediate shaft is movably mounted in the carrier element, the direction of movement of said intermediate shaft corresponding to the direction of the reaction force acting on the intermediate shaft; and
   said carrier element is fixed in its position by a force measuring means, and in that the idling friction torque $RM_A$ of the first shaft and the idling friction torque $RM_Z$ of the intermediate shaft satisfy, with their absolute values and the predetermined condition $R_3$ is greater than $R_2$, the following condition:

$$\frac{R_3 - R_2}{R_1} = \frac{RM_Z}{RM_A}$$

wherein
   $R_1$ = geometrical radius of the first spur wheel,
   $R_2$ = geometrical radius of the second spur wheel,
   $R_3$ = geometrical radius of the third spur wheel,
   $R_4$ = geometrical radius of the fourth spurh wheel.

2. The apparatus according to claim 1, characterized in that the spur wheel having the radius $R_3$ has internal toothing and not only $R_3 > R_2$ but also $R_2 > R_1$.

3. The apparatus according to claim 1 wherein said apparatus is adapted to receive changeable spur wheels of different gearwheel widths to vary the friction torques.

4. The apparatus according to claim 1 further comprising means for adjusting the friction torques by a hydraulic brake acting on the spur wheels.

5. The apparatus according to claim 4, wherein said hydraulic brake comprises a plate spaced a certain distance opposite the front surface of the spur wheel, and means for adjusting the distance between said plate and said spur wheel.

6. The apparatus according to claim 2, wherein said apparatus is adapted to receive changeable spur wheels of different gearwheel widths to vary the friction torques.

7. The apparatus according to claim 2, further comprising means for adjusting the friction torques by a hydraulic brake acting on the spur wheels.

8. The apparatus according to claim 7, wherein said hydraulic brake comprises a plate spaced a certain distance opposite the front surface of the spur wheel, and means for adjusting the distance between said plate and said spur wheel.

* * * * *